United States Patent [19]

Shulman

[11] Patent Number: 4,577,070

[45] Date of Patent: Mar. 18, 1986

[54] HOLDER FOR INCONSPICUOUSLY MOUNTING A MICROPHONE

[76] Inventor: Yuri Shulman, 8326 N. Keystone St., Skokie, Ill. 60076

[21] Appl. No.: 655,865

[22] Filed: Sep. 28, 1984

[51] Int. Cl.[4] .................... H04R 1/02; A47D 15/00; F16L 3/12

[52] U.S. Cl. .................... 179/146 R; 179/153; 248/74.1; 248/74.2; 248/104

[58] Field of Search .................... 179/146 R, 147, 151, 179/152, 153, 178, 179; 248/68.1, 74.1, 74.2, 102, 103, 104

[56] References Cited

U.S. PATENT DOCUMENTS 2,616,985 11/1952 Levy .................... 179/107 R 2,673,898 3/1934 Reichert .................... 179/107 R 3,258,544 6/1966 Haan .................... 179/179

3,864,531 2/1975 Watson .................... 179/179

4,410,772 10/1983 Sato .................... 179/157

OTHER PUBLICATIONS

Brochure For Shure Brothers Microphone And Circuitry Products, Lavalier Microphone Holder, p. 56, Aug. 1982.

*Primary Examiner*—Gene Z. Rubinson

*Assistant Examiner*—Danita R. Byrd

*Attorney, Agent, or Firm*—Allegretti, Newitt, Witcoff & McAndrews, Ltd.

[57] ABSTRACT

A holder for inconspicuously mounting a microphone, which includes a base structure for attachment to a particular surface and a cradle structure adapted to interlockingly receive the microphone housing in any one of four orientations.

7 Claims, 5 Drawing Figures

HOLDER FOR INCONSPICUOUSLY MOUNTING A MICROPHONE

BACKGROUND OF THE INVENTION

The present invention relates generally to a microphone mounting device and more particularly to a holder for inconspicuously mounting a microphone in any one of four orientations.

Advances in microphone technologies have resulted in "miniature" microphones, which are designed to be virtually inconspicuous during use. The difficulty in achieving inconspicuousness lies at least partially in the microphone mount or holder which must itself be small and unobtrusive.

Mounting is far complicated by the directional nature of many "miniature" microphones. To provide effective sound reception, the microphone must be directed towards the sound source, such as the mouth of a singer or the working area of a guitar. In certain applications, it may also be desirable to change the direction or orientation of the microphone with respect to the sound source in order to create a certain effect.

SUMMARY OF THE INVENTION

In a principal aspect, the present invention is a holder for inconspicuously mounting a microphone in one of four different and distinct orientations. The holder includes a base structure and a cradle structure, and the microphone is inserted into cradle structure in the desired orientation.

More particularly, the base structure provides a simple, inconspicuous means for attaching or securing the holder to a surface, such as a guitar or a piece of clothing. The cradle structure includes four struts extending from the base structure. The struts have bi-directional flexibility such that the microphone is receivable in the four distinct orientations. There is a "snap fit" between the microphone and the cradle structure such that an interlocking is achieved upon insertion under pressure.

It is thus an object of the present invention to provide an improved mounting device for a microphone. Another object is an improved microphone holder adapted to receive a microphone in four distinct and generally opposed orientations.

Still another object is an inconspicuous multi-orientation microphone holder which is durable and impact resistance. It is a further object of the present invention to provide an inconspicuous holder, having multiple microphone orientations, which is readily and inexpensively manufactured.

These and other features, objects, and advantages of the present invention are set forth or implicit in the following description.

BRIEF DESCRIPTION OF THE DRAWINGS

Various preferred embodiments of the present invention will be described, in detail, with reference to the drawing herein.

DETAILED DESCRIPTION OF PREFERRED EMBODIMENTS

Figure 1:
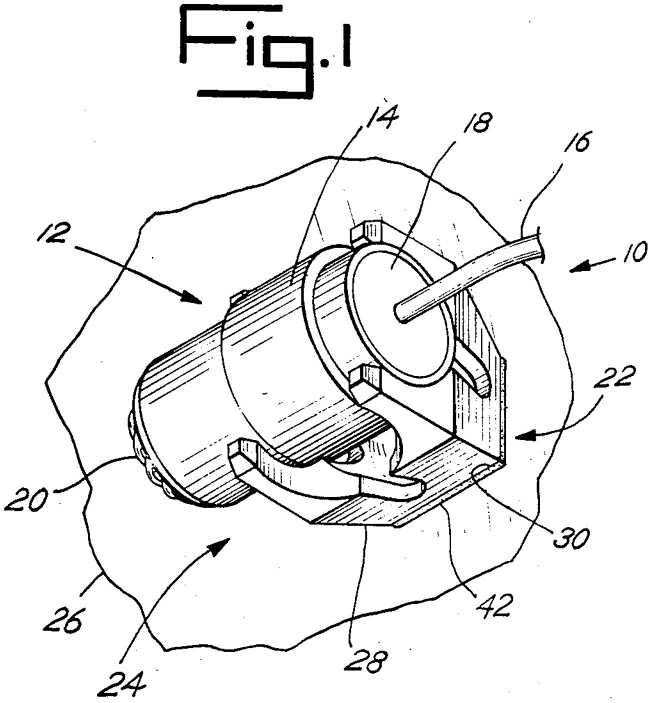
FIG. 1 is a perspective view of a first preferred embodiment of the present invention.

In FIGS. 1-5, two preferred embodiments of the present invention are shown as a holder 10 for a microphone 12. The microphone 12 is a miniature type, having a substantially cylindrical housing 14. An electrical cord 16 extends conventionally from a closed end 18 of the housing 14, opposite a sound reception end 20. The cord 16 may, however, extend substantially laterally from the housing 14.

The holder 10 is preferably an integral body, injection molded to minimize production costs. A particularly suitable material is "LEXAN", a polycarbonate material marketed by General Electric.

The holder 10 includes base means and cradle means, generally designated 22 and 24, respectively. The base means 22 is adapted to secure the holder 10 to a surface 26.

As shown, the base means 22 includes a base section 28 having a hollow, truncated pyramid configuration. This configuration has a substantially rectangular mounting wall 30 and four sloping, diverging substantially trapezoidal side walls 32, 34, 36, 38, which cooperate to define an interior cavity 40.

Figure 4:
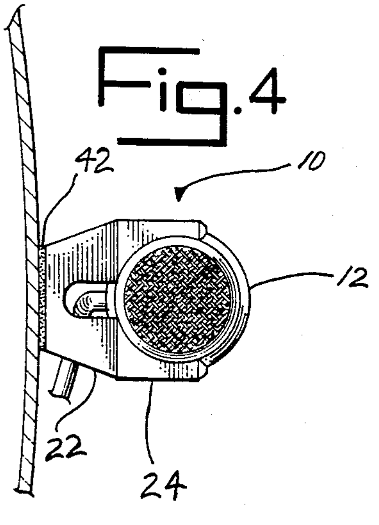
FIG. 4 is a side view of the preferred embodiment shown in FIG. 1.
Figure 5:
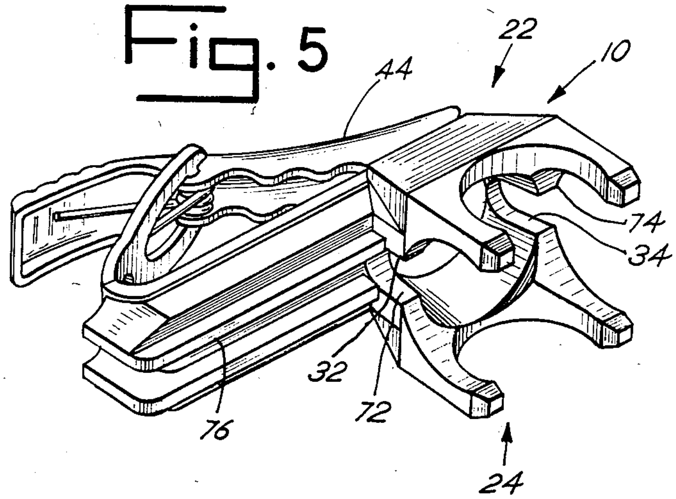
FIG. 5 is a perspective view of a second preferred embodiment of the present invention.

As shown in FIG. 4, the mounting wall 30 of the base means 22 carries an adhesive strip 42. This preferred embodiment of the holder 10 is thus utilized when the surface 26 is a flat, hard surface. Further, this preferred embodiment of the holder 10 can be sewn to an article of clothing. As shown in FIG. 5, a second preferred embodiment of the holder 10 includes a clasp 44, secured to the mounting wall 30, for attaching the holder 10 to an article of clothing.

Referring again to FIGS. 1-4, the base means 22 further defines four notches or channels 46, 48, 50, 52 in communication with the interior cavity 40. The notches 46, 48, 50, 52 are preferably centrally located in the side walls 32, 34, 36, 38, respectively, and are adapted to accommodate a laterally-extending cord 16. That is, the base means 22 and more particularly the notches 46, 48, 50, 52 thereof cooperate to define access means, generally designated 54, for accommodating the laterallyextending cord 16 of the microphone 12. This accommodation is achieved irrespective of the orientation of the microphone 12 with respect to the holder 10.

The cradle means 24 is adapted to interlockingly receive the microphone 12 in four distinct orientations with respect to the holder 10. As shown, the cradle means includes four struts 56, 58, 60, 62 extending from the base means 22. The struts 56, 58, 60, 62 are generally located at the corners of the substantially rectangular mounting wall 30 and extend substantially perpendicular thereto. Each strut 56, 58, 60, 62 has a four-sided pillar configuration.

Figure 2:
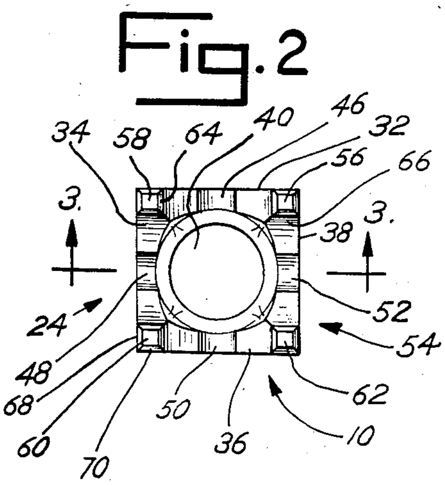
FIG. 2 is a top view of the preferred embodiment shown in FIG. 1 (without the microphone)
Figure 3:
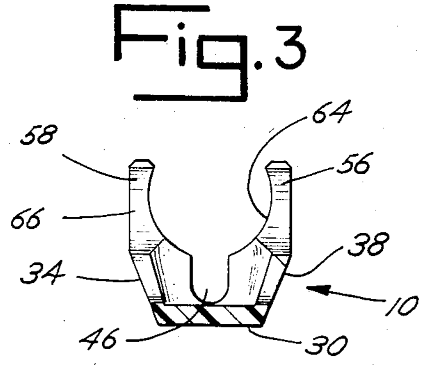
FIG. 3 is a cross-sectional view of the preferred embodiment shown in FIG. 2 taken along 3—3.

Referring particularly to FIGS. 2 and 3, each strut 54, 56, 58, 60 has two substantially concave interior walls 64, 66 adapted to substantially match or mate with the substantially cylindrical housing 14 of the microphone 12. The exterior walls 68, 70 of each strut 56, 58, 60, 62 are substantially flat.

Each of the struts 56, 58, 60, 62 has a bi-directional flexibility so as to snappingly and repetitively receive and release the microphone 12. The direction of strut flexibility is substantially perpendicular to the concave interior walls 64, 66. Flexibility is derived from the plasticity of the holder material, the particular strut configuration, and the notches 46, 48, 50, 52 which interpose the struts 56, 58, 60, 62.

As noted, the microphone 12 may be placed into the holder 10 in any one of four distinct orientations. That is, the sound reception end 20 of the microphone 12 may be directed or pointed in four different directions, displaced from one another by ninety degrees (90°).

When the microphone 12 engages the cradle means 24 under pressure, the struts 56, 58, 60, 62 flex outwardly to snappingly receive the housing 14. Under opposite pressure, the struts 56, 58, 60, 62 flex and open to release the microphone 12. This action occurs irrespective of microphone orientation.

Referring again to FIG. 5, the clasp 44 has a clothing clip configuration. In this preferred embodiment, the base means 22 includes only two notches 72, 74, substantially longitudinally aligned and defined by side walls 32, 36, respectively. The clasp 44 includes or defines a channel extension 76, substantially aligned with the notches 72, 74. A laterally-extending cord 16 may be hidden within the channel extension 76 of the clasp 44 in two of the four possible microphone orientations to further enhance the overall inconspicuousness of the holder 10 and microphone 12.

Various embodiments of the present invention have been shown and described herein. It is to be understood, however, that changes and modifications can be made without departing from the true scope and spirit of the present invention, which is defined by the following claims to be interpreted in light of the foregoing specification.

What is claimed is:

1. A holder for inconspicuously mounting a microphone comprising:
   base means for securing said holder to a surface; and
   cradle means for interlockingly receiving said microphone in four distinct orientations with respect to said holder, said cradle means including four struts extending from said base means, each of four struts having a bi-directional flexibility so as to snappingly receive and release said microphone.

2. A holder as claimed in claim 1 wherein said base means includes a mounting wall.

3. A holder as claimed in claim 2 wherein said mounting wall carries an adhesive strip.

4. A holder as claimed in claim 1 wherein said base means defines a series of notches interposed said four struts to enhance said bi-directional flexibility.

5. A holder as claimed in claim 4 wherein said microphone includes a cord, said notches cooperatively defining access means for accommodating said cord irrespective of the orientation of said microphone within said cradle means.

6. A holder as claimed in claim 1 or 4 wherein each of said struts has substantially concave interior walls to substantially match said microphone.

7. A holder for a microphone having a cord comprising:
   base means for securing said holder to a surface, said base means including a mounting wall and side walls defining an interior cavity, each of said side walls having a centrally located notch in communication with said interior cavity; and
   cradle means for interlockingly receiving said microphone in four district orientations with respect to said holder, said cradle means including four struts extending from said base means substantially perpendicular to said mounting wall, each of said four struts having substantially concave interior walls to accommodate said microphone, said substantially concave interior walls and said notches cooperatively providing a bi-directional flexibility to said struts, whereby said holder and said cradle means snappingly receive and release said microphone.

* * * * *